United States Patent

[11] 3,595,366

| [72] | Inventor | James G. Johanski<br>Green Bay, Wis. |
|---|---|---|
| [21] | Appl. No. | 841,659 |
| [22] | Filed | May 13, 1969<br>Division of Ser. No. 690,526, Dec. 14, 1967,<br>Pat. No. 3,540,971 |
| [45] | Patented | July 27, 1971 |
| [73] | Assignee | Safeway Stores Incorporated<br>Oakland, Calif. |

[54] CONVEYER STRUCTURE FOR PACKAGING MACHINES
4 Claims, 4 Drawing Figs.

[52] U.S. Cl. .................................................. 198/24
[51] Int. Cl. ...................................................... B65g 47/82
[50] Field of Search ............................................ 198/21, 24, 33 R

[56] References Cited
UNITED STATES PATENTS

| 2,836,282 | 5/1958 | Rompre ...................... | 198/21 X |
| 3,388,812 | 6/1968 | Cooper ........................ | 198/33 X (R4) |

*Primary Examiner*—Edward A. Sroka
*Attorney*—Hill, Sherman, Meroni, Gross & Simpson

ABSTRACT: Apparatus for the continuous wrapping, weighing and labeling of articles employs an article transporting system for feeding the output of a wrapping station to weighing and labeling stations. The transporting system comprises a pair of horizontal conveyors at different levels with an inclined conveyor therebetween having an ejector to impart a force to propel an article up the inclined conveyor before the next succeeding article reaches the inclined conveyor.

PATENTED JUL 27 1971
3,595,366
SHEET 2 OF 2
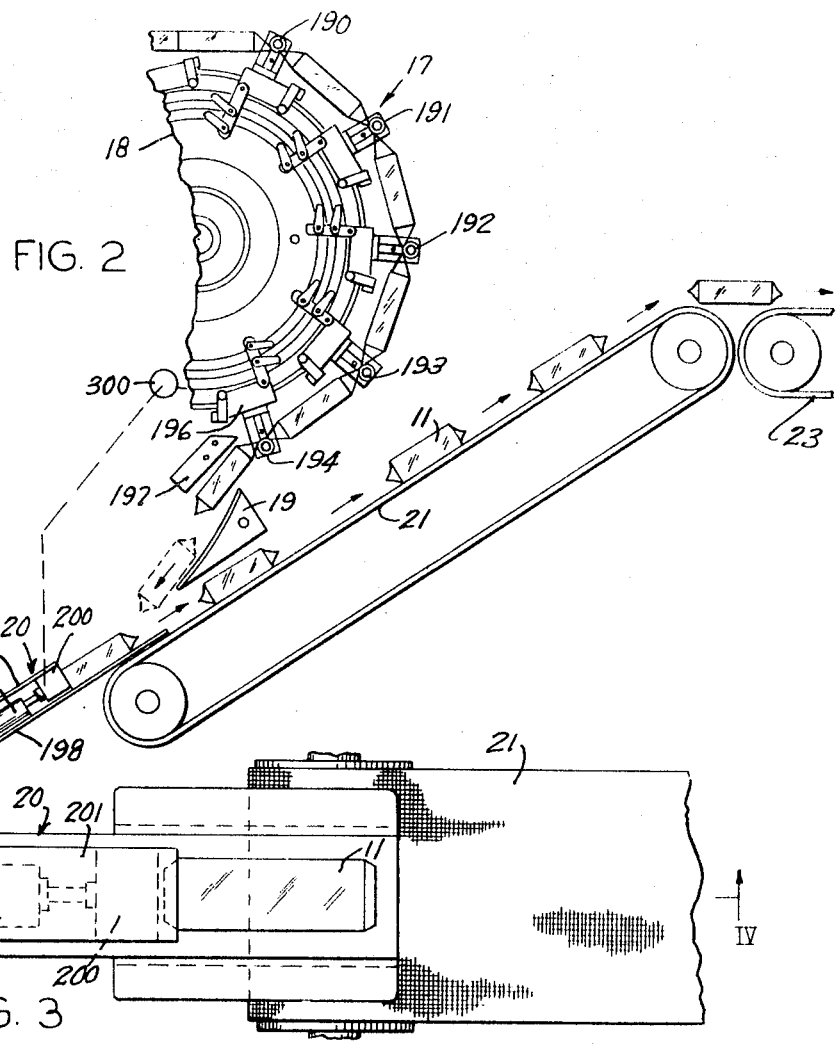
FIG. 2
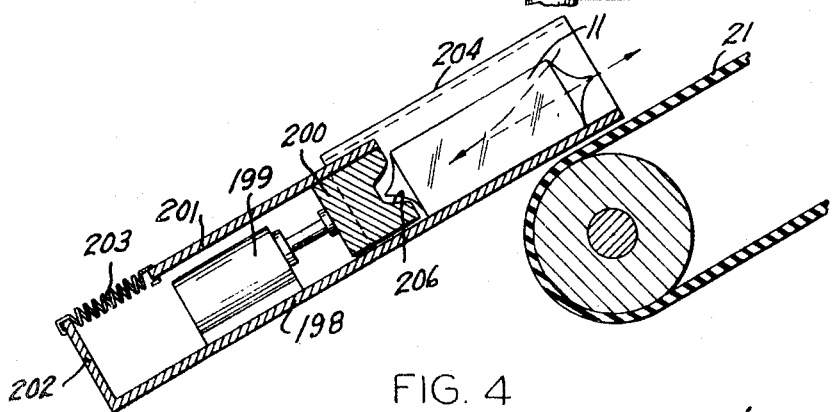
FIG. 3
FIG. 4
INVENTOR
James G. Johanski, Jr.
ATTORNEYS

CONVEYER STRUCTURE FOR PACKAGING MACHINES

This is a division of Ser. No. 690,526, filed Dec. 14, 1967 and now U.S. Pat. No. 3,540,971.

BACKGROUND OF THE INVENTION

1. Field of the Invention

This invention relates generally to a method and apparatus for transporting a plurality of spaced-apart articles along a continuous path and diverting the articles from the continuous path to an alternate path to perform an operation on the articles after which the articles are then diverted back to a continuous path of conveyance. Specifically, the present invention is directed to conveyor apparatus for transporting articles, such as block cheese, between different horizontal levels.

2. Description of the Prior Art

Heretofore, articles such as block cheese were packaged and weighed individually, by hand, and a label printed and attached to the article to indicate the weight and price of each article.

SUMMARY OF THE INVENTION

Briefly, the apparatus of the present invention includes a conveyor for conveying spaced-apart articles, such as cheese, through a wrapping station to wrap each article and thereafter deliver the article to a next conveyor whereupon the articles activate a pulser-switch device. A feature of the present invention includes an ejector for receiving the articles from the wrapper to impose a force on the article to assist the article along the next conveyor. The articles activate the pulser-switch device to control a diverting mechanism which diverts certain ones of the articles along an alternate path for weighing and labeling.

BRIEF DESCRIPTION OF THE DRAWINGS

Other objects, features and advantages will be more fully realized and understood from the following detailed description when taken in conjunction with the accompanying drawings wherein like reference numerals throughout the various views of the drawings are intended to designate similar elements or components, and wherein:

FIG. 2 is a side elevational view of a film packaging device which delivers packages to an ejector which transports and spaces the packages along an uphill conveyor;

FIG. 3 is a top plan view of the ejector of FIG. 2;

FIG. 4 is a side elevational sectional view of the ejector of FIG. 2.

DESCRIPTION OF THE PREFERRED EMBODIMENTS

Figure 1:
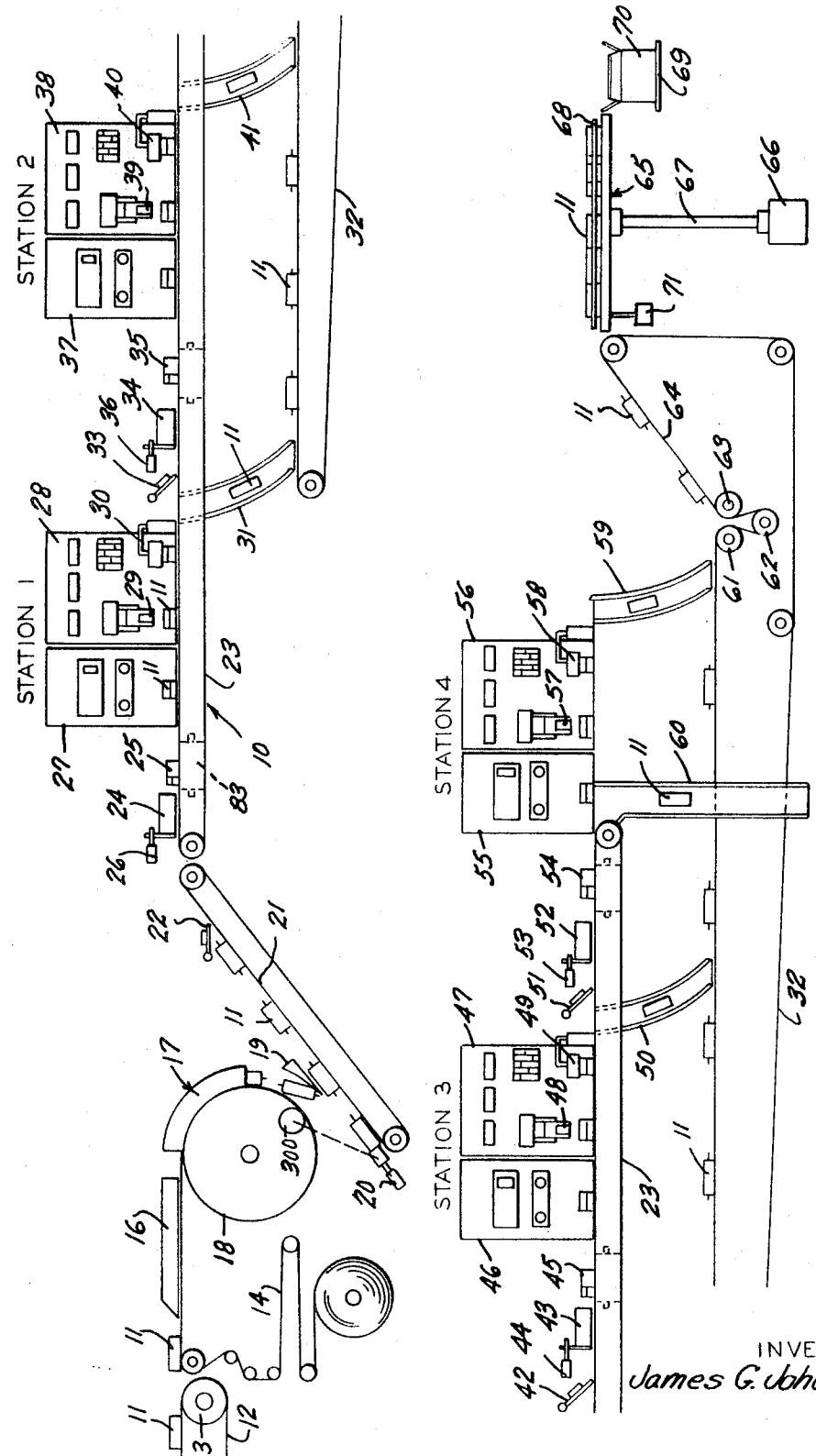
FIG. 1 is an elevational schematic representation of a conveying apparatus constructed in accordance with the principles of this invention.

Seen in FIG. 1 is an apparatus for transporting articles which is designated generally by reference numeral 10. A plurality of spaced-apart articles 11 is transported by a first conveyor 12 which passes over a roller 13. The articles 11 may be blocks of cheese which are cut from a large block and therefore may be of different weights. This type of article is sold by the pound, and therefore the article must be weighed to determine its relative cost. The article 11 is transported to a wrapping station which includes a continuous feed of plastic film 14. The article 11 is placed upon the film 14 and is fed through a longitudinal sealer 16 where the flat sheet of film is wrapped about the article and sealed in the longitudinal direction. The wrapped article is then fed to a transverse sealer 17 which may be part of a continuous rotatable drum 18. Also associated with the transverse sealer 17 is a cutter which severs the film between articles to separate the individually wrapped articles.

The articles from the sealer and cutter 17 pass through a chute indicated generally by reference numeral 19 and are directed toward ejector 20. The ejector 20 is a reciprocating device which imparts a force on each of the articles to assist and space the articles along an inclined conveyor 21. Although the articles 11 are caused to change direction from the chute 19 to the conveyor 21, it will be understood that means may be provided to eliminate the change of direction of the articles by extending the overall dimension of the conveying apparatus. Therefore, the term continuous feed or continuous transporting of the articles includes the changing of direction of the articles from the chute 19 to conveyor 21.

Each of the articles traveling along the inclined conveyor 21 actuates a pulser switch deflector 22 which develops a pulse signal responsive to each article passing this point. By way of example, the pulser switch 22 may be a multiple count device which produces a control signal after counting the articles passing this point.

When the articles reach the top of conveyor 21 they are transferred to a substantially horizontal conveyor 23. The initial portion of conveyor 23 includes a deflector 24 which deflects certain of the articles from the conveyor 23 to an alternate path. The articles traveling along the alternate path engage a guiding wall and switch means 25. The deflector 24 is operated by an air cylinder 26 which, in turn, is controlled in response to the pulse switch 22. For example, the first article actuating pulser switch 22 is delivered to conveyor 23 and to conveyor 83. However, the first article actuating the pulser switch 22 causes the air cylinder 26 to actuate the deflector 24 to cause the first article to be diverted from the conveyor 23 to an alternate path whenever switch 227 is closed dependent upon labeler cycle.

Associated with the alternate path initiated by deflector 24 is a scale 27 which weighs the article 11 and produces an electrical impulse indicative of the weight to control the operation of a printer and labeling device 28. The label printer 28 prints a label and delivers it to an applying position indicated by reference numeral 29 and the label is applied to the top of article 11. The article 11 then moves along the alternate path to a position and the label is pressed firmly to the article by a label holddown device 30. The labeled article is then delivered to a chute 31 which delivers the labeled article to a conveyor 32.

It will be understood that the labeled article may be directed back to the conveyor 23 and means provided to sense that the article has been labeled. Furthermore, by using a second conveyor 32 parallel to the conveyor 23 the overall dimension of the conveyor apparatus is decreased. Therefore, the path of the article entering the alternate path to the first weighing and labeling station and therefrom to the second conveyor 32 is intended to be a continuous path.

The articles transported along conveyor 23 which are not diverted to the first weighing and labeling station engage a second pulser-switch device 33. The second pulser-switch device 33 develops a control signal in response to sensing articles passing this point whenever switch 227 is closed dependent upon labeler cycle. Actuation of the pulser-switch device 33 actuates a diverter 34 to divert the third article from conveyor 23 to an alternate path including a directing wall 35. The diverter 34 is controlled by an air cylinder 36 in response to the control signal developed by the pulser switch 33.

The articles directed along the second alternate path are delivered to a scale 37 which weighs the article and produces a control signal to operate a printer and labeler 38. The printer and labeler 38 prints a label indicative of the weight and price of the article and delivers the label to an applicator indicated by reference numeral 39. The label is then applied to the article and the article is transported to a position where the label is pressed to the article by a holddown device 40. The labeled article is then delivered to a second chute 41 and therefrom to the conveyor 32.

The articles remaining on the conveyor 23 engage a third pulser switch 42 which produces a control signal in response to sensing other articles. Pulsers from the pulser switch 42 cause a diverter 43 to divert every other article along a third alternate path whenever switch 227 is closed dependent on the labeler cycle. The diverter 43 is operated by an air cylinder 44 which, in turn, is actuated in response to pulses developed by the pulser switch 42. The third alternate path includes a directing wall 45 for directing the articles to a scale 46. The scale 46 weighs the article and produces an electronic signal indicative of the weight to operate a printer and labeler 47. The printed label is delivered to an applicator indicated by reference numeral 48 and applied to the article. The labeled article is then transported to a position where a holddown device applied pressure to the label to ensure that the label is fixedly secured to the article. The labeled article is then transported to a chute 50 and therefrom to the conveyor 32.

The articles remaining on the conveyor 23 engage a pulser-switch device 51 which produces a control signal upon sensing articles passing this point. The pulser-switch device 51 controls a deflector 52 which, in turn, is operated by an air cylinder 53. The articles diverted to the fourth alternate path engage a directing wall 54 in route to a scale 55. The scale 55 produces a control signal indicative of the weight of the article to operate a printer and labeler 56. The printer and labeler 56 prints a label and delivers the printed label to an applicator indicated by reference numeral 57 and the printed label is applied to the article. The article is then transported to a holddown position where a holddown device 58 applies pressure to the label, thereby insuring that the label is fixedly secured to the article. The labeled article is then delivered to a chute 59 and therefrom to the end of conveyor 32.

Should the pulser-switch devices 22, 33, 42 and 51 be set to divert articles in positions other than the first, second, third and fourth positions, a reject chute 60 is provided to receive the excess articles. Furthermore, articles too small to actuate the pulser switches are delivered to the reject chute 60.

The end of conveyor 32 is wrapped about a plurality of rollers 61, 62 and 63 which provides means for changing the direction of the continuous conveyor belt. Therefore, rollers 61, 62 and 63 provide means for delivering the articles up an inclined path 64 and therefrom to an accumulator indicated generally by reference numeral 65.

The accumulator 65 includes a drive motor mechanism 66 and a rotatable shaft 67 for rotating the accumulator table. A guard rail 68 is positioned about the periphery of the accumulator table to prevent articles thereon from falling off the table. A packing station, indicated generally by reference numeral 69 includes a carton 70 for receiving a predetermined number of articles which are placed in the carton for shipment. Also associated with the accumulator 65 is a sensing device 71 which senses a relative number of articles collected on the accumulator and may include switch means to deactuate the conveying system thereby preventing further articles which would ultimately spill over the accumulator, from being delivered to the accumulator.

Therefore, the overall scheme of the apparatus shown in FIG. 1 provides means for directing a plurality of spaced-apart articles along a continuous path while diverting certain ones of the articles along a plurality of alternate paths to perform an operation on the articles, such as weighing and labeling, and then directing the articles back to a continuous path and therefrom to an accumulator.

For a better understanding of the operation of diverting articles along an alternate path, reference may be taken to my copending application of the same title, Ser. No. 690,526, filed Dec. 14, 1967, now U.S. Pat. No. 3,540,971 and assigned to the same assignee as the present invention, the disclosure of which application is fully incorporated herein by this reference.

Seen in FIG. 2 is the detailed construction of the transverse sealing and cutting mechanism 17 associated with the drum 18. The sealing and cutting device includes a plurality of transverse heat elements 190, 191, 193 and 194. Associated with each of the heating elements is a pressure applying device, for example, 196 associated with heating element 194, to sever the foil packaging between successive articles. A deflector 197 directs the separated article toward the chute 19 and therefrom to the ejector 20.

As best seen in FIG. 3, the ejector 20 includes a bottom plate 198 which extends over the leading edge of the inclined conveyor 21. A pneumatic cylinder 199 is secured to the plate 189. Associated with the pneumatic cylinder 199 is a drive piston 200 and a bracket 201. The cylinder 199 is fixedly secured to the plate 198 and the bracket 201 is secured to a bracket 202 via a spring 203. The spring 203 retracts the drive piston 200 each time the piston is urged forward to propel and space the articles of the inclined conveyor 21 thereby assisting the movement of the articles in an upward direction.

As seen in FIG. 4, the ejector may include a protective shroud or covering 204 to act as somewhat of a guide for the articles. Furthermore, the drive piston 200 may include a recessed portion 206 to receive the tablike portion of the wrapping of the article 11.

Also according to the present invention a sensing device 300 is associated with the drum 18 to sense that a wrapped package has dropped into the underlying inclined area in position to be propelled up the inclined plane by the ejector 20. Also according to the present invention the deflector 197 and chute 19, as seen in FIG. 2 provide means for ensuring that the package leaving the drum 18 falls in position against the ejector 20 without tumbling. This ensures that the longitudinal seam formed by the packaging device 16, of FIG. 1, is at the bottom of the package as the package is conveyed along the conveying path. It will be understood that by proper spacing and geometry of the drum 18, with respect to the underlying inclined area just preceding the ejector 20, the deflector 197 and chute 19 may be eliminated.

The present application has disclosed a method and apparatus of transporting spaced-apart articles along a continuous moving path and diverting certain of the articles along alternate paths to perform the operation of weighing, printing a label and applying the label to the article. The labeled article is then directed to a continuous moving path where the articles are accumulated for packaging. Accordingly, it will be understood that variations and modifications may be effected without departing from the spirit and scope of the novel concepts of this invention.

The embodiments of the invention in which an exclusive property or privilege is claimed are defined as follows:

I claim:

1. A conveying apparatus for conveying a plurality of spaced-apart articles comprising: first and second conveyors positioned in substantially horizontal planes, said second conveyor being higher than said first conveyor; and third conveyor positioned between said first and second conveyors and inclined upwardly toward said second conveyor; an ejector at the bottom of said third conveyor to impart an upward force to the articles to assist in moving the articles along the inclined path of said third conveyor, said ejector including an actuating device, a drive piston connected to said actuating device, and biasing means connected to said drive piston to urge said drive piston to a neutral position for receiving articles to be assisted up the inclined path of said third conveyor; chute means for directing the articles from said first conveyor to said drive piston; and a chamber formed about said drive piston such that said drive piston forms a movable wall of said chamber, said chamber positioned to receive articles from said chute.

2. A conveyor according to claim 1 further including means for receiving articles from said second conveyor for weighing and labeling the articles.

3. A conveyor apparatus for conveying a plurality of spaced-apart articles comprising: first and second conveyors positioned in substantially horizontal planes, said second conveyor being higher than said first conveyor; an inclined plane positioned between said first and second conveyors; an ejector at the bottom of said inclined plane to impart an upward force to the articles at the end of said first conveyor to move the articles to said second conveyor, said ejector including an actuating device, a drive piston connected to said actuating device, and biasing means connected to said drive piston to urge said drive piston to a neutral position for receiving the articles to be propelled up said inclined plane; chute means for directing the articles from said first conveyor to said drive piston; and a chamber formed about said drive piston such that said drive piston forms a movable wall of said chamber, said chamber positioned to receive the articles from said chute means.

4. A conveyor according to claim 3 further including means for receiving articles from said second conveyor for weighing and labeling the articles.